United States Patent [19]

Margolis

[11] Patent Number: 5,082,678
[45] Date of Patent: Jan. 21, 1992

[54] FAT REMOVAL FROM MEAT PATTIES

[76] Inventor: Geoffrey Margolis, 12229 Falkirk La., Los Angeles, Calif. 90049

[21] Appl. No.: 430,088

[22] Filed: Oct. 30, 1989

Related U.S. Application Data

[63] Continuation of Ser. No. 224,449, Jul. 25, 1988, abandoned.

[51] Int. Cl.⁵ .................. A23L 1/317; A23L 1/318
[52] U.S. Cl. ............................ 426/281; 426/417; 426/646
[58] Field of Search ............... 426/281, 641, 646, 418, 426/480, 523, 417

[56] References Cited

U.S. PATENT DOCUMENTS

| | | | |
|---|---|---|---|
| 1,656,662 | 1/1928 | Carter et al. | |
| 2,070,850 | 2/1937 | Trabold | |
| 2,075,407 | 3/1937 | Schwartzman | |
| 3,344,731 | 10/1967 | Trees | 99/257 |
| 3,457,853 | 7/1969 | Morley | 99/349 |
| 3,556,809 | 1/1971 | Strandine | |
| 3,603,240 | 9/1971 | McCarthy | 99/251 |
| 3,663,233 | 5/1972 | Keszler | |
| 3,675,567 | 7/1972 | Rejsa et al. | 99/257 |
| 3,682,655 | 8/1972 | Touba | 426/523 |
| 3,739,712 | 6/1973 | Duning | 99/349 |
| 3,754,469 | 8/1973 | Gasior | 99/532 |
| 3,762,307 | 10/1973 | Badovinac | 99/345 |
| 3,802,635 | 4/1974 | Drischel | 241/282 |
| 3,863,556 | 2/1975 | Townsend | 99/487 |
| 3,906,115 | 9/1975 | Jeppson | 426/243 |
| 3,922,357 | 11/1975 | Townsend | 426/281 |
| 3,949,659 | 4/1976 | Hunt | 99/348 |
| 3,965,807 | 6/1976 | Baker | 99/375 |
| 4,005,226 | 1/1977 | Dykes et al. | 426/281 |
| 4,072,092 | 2/1978 | Kohli | 99/389 |
| 4,119,022 | 10/1978 | Dykes et al. | 99/532 |
| 4,142,000 | 2/1979 | Townsend | 426/281 |
| 4,178,660 | 12/1979 | Olney et al. | 17/42.1 |
| 4,213,380 | 7/1980 | Kahn | 99/349 |
| 4,254,151 | 3/1981 | Townsend | 426/231 |
| 4,287,218 | 9/1981 | Rich | 426/272 |
| 4,292,889 | 10/1981 | Townsend | 99/633 |
| 4,299,851 | 11/1981 | Lowe | 424/132 |
| 4,315,950 | 2/1982 | Reed | 426/509 |
| 4,345,514 | 8/1982 | Morley | 99/349 |
| 4,487,119 | 12/1984 | Townsend | 99/487 |
| 4,523,520 | 6/1985 | Hofmann | 99/352 |
| 4,601,237 | 7/1986 | Harter et al. | 99/349 |
| 4,622,892 | 11/1986 | Corominas | 99/533 |
| 4,667,589 | 5/1987 | Bishop | 99/386 |
| 4,715,357 | 12/1987 | Sherman et al. | 126/39 |
| 4,746,522 | 5/1988 | Wofford | 426/243 |

FOREIGN PATENT DOCUMENTS 41467  3/1985  Japan .................... 426/281

Primary Examiner—Arthur L. Corbin
Attorney, Agent, or Firm—Spensley Horn Jubas & Lubitz

[57] ABSTRACT

A method for removing fat from a meat patty by heating the meat patty on both sides to a temperature sufficient to cause fat contained in the meat patty to liquefy, and then applying pressure to the meat patty sufficient to cause at least a portion of the liquefied fat contained in the meat patty to be exuded therefrom. The method also preferably includes the step of injecting a liquid flavoring solution into the cooked and pressed meat patty to improve flavor and juiciness.

18 Claims, No Drawings

FAT REMOVAL FROM MEAT PATTIES

This is a continuation of application Ser. No. 07/224,449 filed on July 25, 1988, now abandoned.

BACKGROUND OF THE INVENTION

The present invention relates to the field of treating meat products. Specifically, the present invention provides for the removal of fat from and the subsequent or independent flavor enhancement of meat products while maintaining the inherent pleasing texture and flavor of the meat. Consequently, meats processed according to this invention will be particularly important to consumers in their fight to reduce heart disease and obesity, without sacrificing the organoleptic qualities of the food they eat.

Heart disease is a major public health concern. Public Health Literature estimates that approximately 1.5 million Americans suffer a heart attack each year, and that 50% of all Americans will die of this insidious disease. Accordingly, much research has been devoted to the prevention and treatment of heart disease.

It is recognized that blood cholesterol levels can be a major factor in determining whether or not an individual will suffer from heart disease. People with elevated blood cholesterol levels have been found to be at a higher risk of developing heart disease than people who have relatively low blood cholesterol levels. It is believed that blood cholesterol levels are influenced by a number of factors. The factors determining an individual's blood cholesterol level are believed to be both genetic, factors over which an individual has no control, as well as environmental, factors over which an individual has control. One environmental factor shown to affect blood cholesterol levels is diet.

It has been clearly shown that a major factor contributing to a relatively high blood cholesterol level is a high dietary intake of saturated fats. A saturated fat is a fat which generally possesses no double or triple bonds (no unsaturation). It is known that animal fats are generally high in saturated fat. Additionally, a high dietary intake of cholesterol itself has been shown to increase blood cholesterol levels.

The American Heart Association ("AHA") has recommended that in order to reduce the risk of heart disease, individuals should reduce their daily dietary intake of fats and cholesterol. Specifically, the AHA has recommended (1) that individuals receive only 30% of their daily caloric intake from fat with only 10% of that amount being derived from saturated fat, and (2) that dietary cholesterol intake be kept below 300 milligrams per day.

Unfortunately, many individuals have demonstrated an unwillingness to modify their diets to meet the AHA guidelines concerning reduced intake of saturated fats and cholesterol. Generally, to reduce the dietary intake of saturated fats and cholesterol it is necessary to reduce the quantity of animal products, particularly red meat, which is consumed, and to replace it with vegetable products or other meat products such as fish and poultry which possess a lower percentage of saturated fat.

As evidenced in U.S. Pat. No. 3,949,659 issued April 13, 1976 to Hunt, it is known to treat meat products to remove a portion of the fat contained therein. Hunt describes an apparatus designed to cook a meat slurry and separate the rendered fat from the cooked meat. The apparatus includes a cooking receptacle for cooking the meat and a perforated member that is driven down into the cooking receptacle so that the cooked meat is forced toward the bottom of the cooking receptacle with the rendered fat passing through the perforated member thus enabling the fat to be separated from the cooked meat. Unfortunately, such extreme methods of removing fat from meat products produce industrial meat products that have an unacceptable appearance, texture and flavor for consumption in their original form by human beings.

Methods of enhancing the flavor of meat products by injecting uncooked meats with a flavor enhancing liquid are also known in the art. For example, U.S. Pat. No. 3,754,469 issued Aug. 28, 1973 to Gasior is directed to a unitary device designed to inject prepared flavorings into meat products prior to their cooking, to thereby improve the taste of the cooked meat products. The unitary device comprises a squeezable container adapted to hold a flavoring solution and a cap and needle, which cap and needle are adapted to be screwed onto the container such that the flavoring liquid contained within the container is in communication with the needle and can thereby be injected into an uncooked meat product. Other pertinent teachings are U.S. Pat. Nos. 2,075,407 and 4,601,237.

Unfortunately, the known methods of treating meat products made from readily available meat cuts to reduce fat and enhance flavor are not capable of producing a meat product with a significantly reduced fat content which possesses the appearance, texture and flavor of an untreated meat product. Thus, from a consumer point of view, known fat reduction and flavor enhancement processes do not produce a reduced-fat meat product which is, from a practical standpoint, equally acceptable as composed to an untreated meat product.

SUMMARY OF THE INVENTION

It is one goal of of the present invention to provide a meat product, such as a ground meat (hamburger) patty, which possesses a reduced fat content and yet maintains the appearance, texture and flavor of an untreated meat product. This goal is achieved by the invention of a process for treating a meat product, which process consists of the steps of (1) cooking the meat product to within a specified temperature range which is sufficiently hot to liquefy a portion of the fat contained in the patty while minimizing the evaporation of water, and (2) then applying a specified amount of pressure to the meat product sufficient to cause a substantial portion of the liquefied fat contained within the meat product to be exuded therefrom with minimal textural and flavor changes.

In a second aspect of the process, the present invention concerns a method for enhancing the flavor of a meat product, which consists of injecting a liquid flavoring solution into the patty after cooking. In a preferred embodiment of the present invention, the two aspects of the invention are combined and the meat product is heated (cooked) and then pressed to extract liquefied fat therefrom. Then, the cooked meat product is injected with a liquid flavoring solution to achieve the flavor and juiciness of an untreated meat product.

DETAILED DESCRIPTION OF THE INVENTION

The present invention concerns methods for reducing the fat content of a meat product and enhancing the flavor of such meat product.

As used herein, the term "meat product" is intended to encompass all types of meat products, such as, for example, beef, veal, lamb, pork, chicken, other poultry, mixtures thereof, and the like. In one preferred embodiment of the present invention, the meat product employed is a ground beef product in the shape of a hamburger patty. Those skilled in the art recognize that hamburger patties generally have a disk shape comprising two generally parallel major surfaces.

The method of the present invention comprises the step of cooking the patty to a temperature sufficient to cause fat contained in the patty to liquefy. It is desirable that the patty not be cooked for a sufficiently long time and to a temperature sufficient to cause an undesirable degree of non-fat moisture contained in the patty to evaporate. The maximum temperature to which a ground beef hamburger patty should be heated is that temperature at which not more than about 55% of the non-fat moisture (percent based on initial patty containing 60% (wt.) moisture—see U.S.D.A. Agric. Handbook No. 8, October, 1975) contained in the patty is caused to evaporate.

Applicant has discovered that it is desirable to have as much non-fat moisture retained in the ground meat patty as possible since the presence of such non-fat moisture has been found to increase the amount of fat removed from the patty. Moreover, the more non-fat moisture which can be retained in the during the process, the "juicier" and tastier and better the texture of the resultant patty will be.

It is desirable to heat the patty to a temperature at which a majority of the fat in the hamburger patty is in a liquefied state. This is because the fat which is removed from the patty in subsequent process steps is most easily removed if it is in a liquefied state. Thus, heating the patty to such a temperature increases the amount of fat removed from the patty and the ease with which it is removed.

As a general rule, the majority of fat present in a ground beef hamburger patty will be liquefied when the center temperature (i.e., the temperature midway between the top and bottom horizontal surfaces of the patty) is about 45° C. Furthermore, it is generally desired that a ground beef hamburger patty not be heated so as to evaporate more than about 55% of the nonfat moisture during the cooking process. Elevating the temperature of the center of a hamburger patty to a temperature above about 75° C. on a griddle or flame broiler will cause an undesirable amount of the non-fat moisture contained in the patty to evaporate. Ideally, the ground beef hamburger patty is elevated to a center temperature of from about 45° C. (rare) to about 60° C. (well done). These temperature ranges are preferred since within the described temperature ranges, an acceptable balance between the amount of fat present in the ground beef hamburger patty which is liquefied and the amount of non-fat moisture retained in the hamburger patty is achievable.

It is also known that heating meat products such as ground beef hamburger patties and other ground meat patties causes the protein contained in the meat product to go through a denaturization process. Applicant has discovered that it is desirable that the protein present in the meat product not be completely denaturized since incomplete denaturization has been found to aid in maximizing the amount of fat that can be removed from the patty while minimizing texture changes. Cooking within the above-mentioned temperature ranges enables one to meet these criteria.

It is recognized that when meat products other than beef hamburger patties are employed (e.g., sausages, hot dogs, poultry dogs, veal dogs, combination dogs, turkey burgers, chicken burgers, veal burgers, and combination meat burgers), the temperature to which such meat products are heated may vary from within the described ranges. Nonetheless, those meat products should be cooked to a temperature at which a majority of the fat contained therein is liquefied and an acceptable amount of the non-fat moisture originally present in the meat product is retained in said meat product after cooking.

After the meat product has been cooked to a temperature sufficient to liquefy at least a majority of the fat contained in the product, pressure is applied to the product sufficient to cause the liquefied fat contained therein to be exuded from the product. The amount of pressure applied to the heated meat product should be sufficient to cause at least a portion of the liquefied fat contained therein to be exuded therefrom. However, it is desirable that the amount of pressure applied to the product not be so great as to cause the product to have a texture or appearance which is rubbery or otherwise unacceptable when compared to a product which has not been subjected to the process of the present invention. That is, the goal of the present invention is to remove the liquefied fat from the meat product but still produce a product which is similar in appearance, texture and flavor to an untreated product.

Applicant has found that it is generally desirable to apply an average amount of pressure of from about 2.5 pounds per square inch to about 14 pounds per square inch to a ground beef hamburger patty. At these relatively low pressures it is possible to cause a desirable quantity of liquefied fat to exude from the patty and yet not destroy the pleasing texture of patty. It is believed that one reason this relatively low amount of pressure has been found sufficient to cause liquefied fat to exude from the patty is because the patty is heated to a temperature below that temperature at which an undesirable amount of the non-fat moisture present in the patty is caused to evaporate. The presence of non-fat moisture in the patty has been found to aid in causing the liquefied fat present in the patty to be exuded upon application of a relatively low pressure.

Suitable methods for applying pressure to the patty include any method which can economically and efficiently apply such pressures to the patty. Applicant has found that in one preferred embodiment of the present invention, the pressure is applied to the cooked patty in a rolling manner. That is, the pressure is applied to the hamburger patty by rolling a pressure-applying device across the surface of the heated (cooked) patty. Application of such a rolling pressure is similar to the instance wherein a cylinder, such as a rolling pin, is rolled across the surface of the patty. During the application of such a rolling pressure, the actual pressure applied to the hamburger patty is applied in only a relatively narrow band across the surface of the patty at any given moment. Applicant has discovered that application of such a rolling band of pressure can produce a patty which has a highly acceptable, non-rubbery texture. It is hypothesized that the application of such a rolling pressure allows the pressure to be dissipated in the areas of the hamburger patty near the narrow band of pressure but not actually under pressure.

Alternatively, it is possible to apply uniform pressure to the entire surface of the heated patty by means such as a pressure plate or similar device. Both methods of applying pressure are suitable for causing the liquefied fat contained in the patty to be exuded therefrom.

Application of an amount of pressure less than about 2.5 pounds per square inch has been found to be insufficient to cause a desirable amount of liquefied fat contained in a ground beef hamburger patty to be exuded therefrom. Similarly, application of an amount of pressure greater than about 12 pounds per square inch, while capable of causing a desirable degree of liquefied fat to be exuded from a ground beef hamburger patty, has been found to produce a patty which has an undesirable rubbery ("tough") texture.

During application of pressure to the patty it is essential that the patty be maintained at a temperature such that the fat contained therein remains in a liquefied state. Accordingly, it is essential that the patty be maintained within the temperature ranges set forth above during application of the pressure.

Further, in order to prevent liquefied fat which is being pressed from the patty from adhering to the surface of the patty or being reabsorbed into the patty, it is desirable that the liquefied fat and other non-fat moisture removed from the patty be encouraged to flow away from the patty. Accordingly, in one preferred embodiment of the present invention, the pressure is applied to the heated patty while the patty is maintained on an inclined surface so that as the liquefied fat and moisture are pressed from the patty, they flow down the incline and away from the patty. Alternatively, it is possible to apply the pressure to the patty while the patty is maintained on a perforated support such that liquefied fat and other moisture pressed from the patty are allowed to flow through the perforations in the support and are thereby removed from the patty and not reabsorbed.

Obviously, when the heated cooked patty is pressed, at least some of the liquefied non-fat moisture contained in the patty will similarly be caused to exude from the patty. Those skilled in the art will recognize that a portion of the "flavor" and "juiciness" of a ground meat patty results from the presence of the non-fat moisture contained in the patty. Therefore, Applicant has found that ground meat patties treated according to the present invention may have their flavor and juiciness enhanced by injecting into the cooked patty a liquid flavoring solution. Such liquid flavoring solution may be comprised in whole or in part by the non-fat moisture removed from the patty during the cooking step or the pressing process step or both. Alternatively, it is also possible to inject, into the cooked patty, a flavoring solution which is not obtained from the non-fat moisture removed from the patty.

While it is known to inject flavoring solutions into meats prior to cooking or during cooking to enhance their flavor, the present invention concerns injecting a flavoring solution into a meat product after it has been cooked. Specifically, after the meat product such as a ground meat patty is subjected to the process steps of cooking and pressing according to the present invention, a liquid flavoring solution is then injected into the hamburger patty. If such injection took place prior to or during cooking most of, the liquid flavoring would be removed during the pressing process step. Accordingly, Applicant has found that it is desirable to inject the patty after both the cooking and the pressing steps.

Any means of injecting a liquid flavoring solution into a meat product is suitable for use in the present invention. Those skilled in the art will recognize a variety of means suitable for causing a flavoring solution to be injected into the pressed ground meat patty. As used herein the term "injected" refers to any means which causes a flavoring liquid to penetrate into the interior (i.e., the intersticial spaces between the fibers) of the patty. For example, the flavoring solution can be injected through one or more needles into the body of the patty. Alternatively, it may be possible to cause a flavoring solution to pass into the body of the patty by spraying or dipping the patty into a liquid flavoring solution. If a liquid flavoring solution is sprayed onto or through the surface of a patty, it is anticipated that such spraying would be conducted at an increased pressure so as to penetrate into the fibers of the meat product. Of course, such increased pressure should not be sufficient to cause the patty to lose its structural integrity. Similarly, if it is desired to dip the patty into a flavoring solution, it may be necessary to place the patty and the flavoring solution in a pressure chamber and subsequently increase the pressure within said chamber so as to cause the desired penetration.

It is to be understood that injection of a liquid flavoring solution into a cooked ground meat patty or other meat product can be done regardless of whether or not the patty or product has been previously subjected to the pressing process step according to the present invention.

If the flavoring solution is to be injected into the patty through one or more needles, Applicant has discovered that it is desirable to inject the flavoring solution along a plane between the two generally parallel major surfaces of the patty. This can be accomplished by inserting the needle or needles midway along an outer edge of the patty towards its center or by inserting the needle or needles through one of the major surfaces of the hamburger patty in such a manner that a flavoring solution injected through the needle or needles is injected along a plane between the two generally parallel major surfaces of the hamburger patty about halfway between the two surfaces.

The process of the present invention can best be understood by reference to the following examples, which are intended as illustrations only and are not to be construed so as to limit the invention as set forth in the claims and specification.

EXAMPLE 1

The meat employed in this Example is ground beef having an initial fat concentration of approximately 20% by weight. The initial fat concentration is determined by laboratory analysis based upon weight. The ground beef is formed into circular hamburger patties weighing in the range of from about 108 to about 114 grams. The hamburger patties have a pre-cooked diameter of 11.5 to 12 centimeters and a thickness of about 1 centimeter. After the ground beef is formed into patties, the patties are frozen in a commercial freezer for at least 12 hours prior to cooking.

The frozen hamburger patties are removed from the freezer and cooked, without thawing, on an electric griddle set at 163° C. During cooking the hamburgers are turned over frequently (at least four times) to ensure even heating throughout the hamburger patty. The temperature of the cooked hamburger patty is measured by a fast-reacting direct-reading electronic thermocouple. The electronic thermocouple is inserted into the hamburger patty to a location approximately halfway between the upper and lower surfaces of the hamburger patty. The temperature which registers on the electronic thermocouple is the cooking temperature set forth in the following tables.

Once the hamburger patty reaches the desired temperature, it is subjected to a pressing step in the following manner. The cooked hamburger is removed from the electric griddle and placed immediately on a flat board which is inclined from the horizontal at an angle of about 12°. A rolling band of pressure is applied to the cooked hamburger patty by rolling a cylindrical drum (rolling pin) over the top surface of the hamburger patty. The fat/water mixture exuded from the hamburger patty during the pressing process is collected in a groove around the edge of the board and emptied into a measuring cylinder. In this manner, the total quantity of fat and non-fat moisture removed from the hamburger patty is determined. The cylindrical drum is rolled across the hamburger patty five times. The total amount of fat removed is determined by volumetric and weight measurement.

The texture of the resultant cooked, pressed hamburger patty is determined both organoleptically and by measurement in the following manner: a thin cutting edge having a thickness of 1 mm and a length of about 45 mm is placed on the top surface of the hamburger patty and the force necessary to push said cutting edge through the hamburger patty is measured. The force necessary to push the cutting edge through the hamburger patty is representative of the toughness of the cooked pressed hamburger patty. This force is set forth in the following tables as the penetration force.

The above-described experiment was conducted on a number of individual hamburger patties cooked to different temperatures and pressed at different pressures. The results of the experiment are set forth in Table 1.

TABLE 1

| Run No | % Starting Fat | Final Cooking Temp (C) | Avg. Applied Pressure[1] (psi) | Percent Water Removed By Evaporation During Cooking[4] | Total Liquid Removed During Pressing Process (ml)[3] | Total Fat Removed During Cooking & Pressing Process (g) | Starting Hamburger Weight (g) | % Fat Removed | ORGANOLEPTIC DESCRIPTION Penetration Force lbf[2] | Bite |
|---|---|---|---|---|---|---|---|---|---|---|
| 1 | 18.3 | 55 | 2.5 | 39 | 14 | 8 | 112 | 39 | 5-6 | Soft, easy to chew |
| 2 | 18.45 | 50 | 2.5 | 27.7 | 15 | 8.4 | 108 | 42 | 4-6 | Soft, easy to chew |
| 3 | 17.6 | 40 | 6.9 | 15.9 | 15 | 7.6 | 112 | 39 | * | Not completely cooked |
| 4 | 17.6 | 47-50 | 6.9 | 22.4 | 23 | 12.8 | 112 | 65 | 5-7 | Soft, easy to chew |
| 5 | 18.45 | 50 | 6.9 | 21.1 | 21 | 11.9 | 108 | 60 | 5-6 | Soft, easy to chew |
| 6 | 18.45 | 48-55 | 6.1 | 24.9 | 19 | 10.8 | 108 | 54 | 6 | Soft, easy to chew |
| 7 | 18.3 | 50-55 | 6.9 | 38.2 | 17.8 | 10.0 | 114 | 46 | 7-7.5 | Firmer, easy bite |
| 8 | 17.6 | 55-60 | 6.9 | * | 19 | 11.2 | 110 | 58 | 7-8 | Firmer, easy bite |
| 9 | 17.6 | 70 | 6.9 | 52.5 | 9 | 8.4 | 110 | 43 | 8-8.5 | Firmer bite; dry taste |
| 10 | 17.6 | 70-75 | 6.9 | 52.5 | 10.5 | 9.2 | 110 | 47 | 10 | Firmer bite; dry taste |
| 11 | 20.4 | 50 | 8.9 | 20.9 | 25 | 15.2 | 110 | 68 | 8 | Firmer, easy bite |
| 12 | 20.4 | 55 | 8.9 | 31.6 | 20 | 12.8 | 110 | 57 | 7-8 | Firmer bite |
| 13 | 20.4 | 55 | 8.9 | 25.6 | 22.5 | 14.0 | 110 | 62 | 8 | Firmer, easy bite |
| 14 | 18.3 | 50-55 | 10.2 | 36.5 | 21.5 | 11.6 | 112 | 57 | 8-10 | Firmer bite, not tough, dry taste |

[1] Mass average applied pressure based on a rolling contact surface 2 cm wide and a hamburger with an after-cooking diameter of 9 cm.
*Not measured
[2] Commercially available hamburger patties have a penetration force of 7-9 lbf.
[3] Fat plus water. Does not include water evaporated or fat removed during cooking.
[4] Percent water based on initial hamburger weight containing 60.2% (wt.) water - Comp. of Foods, U.S.D.A. Handbook No. 8 (1975)

EXAMPLE 2

The procedure of Example 1 was repeated except that the pressure was applied in a different manner. The cooked hamburger patty was placed on a flat support surface having perforations. A flat pressing surface was placed on the cooked hamburger patty and varying amounts of force were applied to the pressing surface to cause liquid fat and non-fat moisture to be exuded from the cooked hamburger patty. This process was repeated on a number of individual hamburger patties, and the results of this experiment are set forth in Table 2.

TABLE 2

| Run No | % Starting Fat | Final Cooking Temp (C) | Avg. Applied Pressure[1] (psi) | Percent Water Removed By Evaporation During Cooking[4] | Total Liquid Removed During Pressing Process (ml)[3] | Total Fat Removed During Cooking & Pressing Process (g) | Starting Hamburger Weight (g) | % Fat Removed | ORGANOLEPTIC DESCRIPTION Penetration Force lbf[2] | Bite |
|---|---|---|---|---|---|---|---|---|---|---|
| 1 | 18.3 | 55 | 2.6 | 30.9 | 15 | 6.8 | 112 | 33 | 5 | Soft, easy to chew |
| 2 | 18.45 | 55 | 2.6 | 27.7 | 15 | 7.2 | 110 | 35 | 5-6 | Soft, easy to chew |
| 3 | 18.3 | 55 | 6.6 | 33.9 | 17 | 9.2 | 112 | 45 | 7-10 | Firmer, easy bite |
| 4 | 18.45 | 55 | 6.6 | 30.1 | 17 | 8.8 | 108 | 40 | 5-6 | Firmer, easy bite |
| 5 | 18.3 | 55 | 14.3 | 27.9 | 24 | 11.6 | 112 | 57 | 10-15 | Firm, rubbery; dry taste |
| 6 | 18.45 | 55 | 14.3 | 27.7 | 22 | 12.0 | 108 | 60 | * | Firm, rubbery |
| 7 | 18.45 | 55 | 14.3 | 30.9 | 22 | 11.2 | 110 | 55 | 8 | Firm, rubbery |
| 8 | 22.0 | 70-73 | 14.3 | 53.8 | 9 | 10.4 | 110 | 43 | 10 | Firm, leathery texture, |

TABLE 2-continued

| Run No | % Starting Fat | Final Cooking Temp (C) | Avg. Applied Pressure[1] (psi) | Percent Water Removed By Evaporation During Cooking[4] | Total Liquid Removed During Pressing Process (ml)[3] | Total Fat Removed During Cooking & Pressing Process (g) | Starting Hamburger Weight (g) | % Fat Removed | ORGANOLEPTIC DESCRIPTION Penetration Force lbf[2] | Bite |
|---|---|---|---|---|---|---|---|---|---|---|
| | | | | | | | | | | dry taste |

[1]Average applied pressure based on a hamburger with an after-cooking diameter of 9 cm.
*Not measured
[2]Commercially available hamburger patties have a penetration force of 7-9 lbf.
[3]Fat plus water. Does not include water evaporation or fat removed during cooking.
[4]Percent water based on initial hamburger weight containing 60.2% (wt.) water.

As can be seen by reference to Tables 1 and 2, desirable quantities of fat can be removed from ground beef patties within the temperature and pressure ranges set forth in the application. As noted in Table 1, Run Nos. 3-10 and in Table 2, Run Nos. 3-4 illustrate particularly desirable conditions in which significant fat is removed while creating a product having good texture and bitability.

EXAMPLE 3

Hamburger patties subjected to the heating and pressing processes set forth in Example 1 were injected with a liquid flavoring solution as follows. The solution comprised a mixture of water and ketchup (42%/58%). The flavoring solution is injected into the hamburger patties through a needle inserted through the outer edge of the hamburger patty towards the center. Approximately 12 milliliters of flavoring solution was injected into the hamburger patties. The flavoring solution was injected through a series of four needle insertions into different areas of the hamburger patty with approximately 3 milliliters of flavoring solution being injected during each needle insertion. The hamburgers so treated were found to be juicy and to possess an appearance, texture and flavor similar to hamburger patties which had been cooked but not subjected to the pressing or flavoring solution injection process steps.

Other flavoring solutions have been tested successfully, including water and either commercially packaged flavorings or water and specifically prepared flavorings; and water, various flavorings and various combinations of oils (with particular emphasis on monounsaturated and polyunsaturated oils).

As is apparent from the foregoing specification, the present invention is susceptible of being embodied with various alterations and modifications which may differ particularly from those that have been described in the preceding specification. For this reason, it is to be fully understood that all of the foregoing is intended to be merely illustrative and is not to be construed or interpreted as being restrictive or otherwise limiting the scope of the present invention, except as it is set forth and defined in the following claims.

What is claimed is:

1. A method for removing fat from a preformed, ground meat patty such that after processing, the patty has a hamburger-like structure and texture, comprising the steps of:
   (a) heating the meat patty on both sides to a temperature sufficient to liquefy a portion of the fat contained in the patty, and to cause partial but not complete denaturization of both sides of the patty;
   (b) applying pressure to the heated meat patty (i) only after a portion of the fat contained in the patty has been liquified during said heating step, (ii) only after the patty has been partially denatured on both sides, and (iii) while the fat portion remains liquified, the pressure being sufficient such that after processing at least about 40% by weight of the fat initially contained in the patty is removed therefrom, but low enough such that a hamburger-like structure and texture is achieved; and
   (c) removing the liquified fat from the immediate vicinity of the patty by carrying out pressure step (b) while the patty is on a support surface constructed to promote the flow of liquified fat out of and away from the patty.

2. A method as defined in claim 1 wherein said support surface is perforated.

3. A method as defined in claim 1 wherein said heating step is carried out to heat the patty to an average center temperature between about 45° C. and 75° C.

4. A method as defined in claim 1 wherein said heating step is carried out to heat the patty to an average center temperature between about 45° C. and 60° C.

5. A method as defined in claim 1 wherein said step of applying pressure is carried out by applying rolling pressure to the heated meat patty.

6. The method of claim 5 wherein the average amount of rolling pressure applied to the patty is within the range of from about 2.5 to about 14 pounds per square inch.

7. The method of claim 5 wherein the rolling pressure is applied at multiple fixed intervals.

8. A method as defined in claim 1 wherein the average pressure applied during said step of applying pressure is between about 2.5 and 14 pounds per square inch.

9. A method as defined in claim 1 wherein said step of heating is carried out under temperature and time conditions such that at the completion of said step of heating the non-fat moisture content of the patty is at least 45% of the moisture content of the patty prior to initiating said step of heating.

10. A method as defined n claim 9 wherein said step of applying pressure is carried out by applying rolling pressure to the heated meat patty.

11. A method as defined in claim 10 wherein the rolling pressure is applied at multiple fixed intervals.

12. A method for improving the eating qualities of a preformed, ground meat patty such that a hamburger-like structure and texture is achieved; comprising the steps of:
   (a) heating the meat patty on both sides to a temperature sufficient to liquefy a portion of the fat contained in the patty, and to cause partial but not complete denaturization of both sides of the patty;
   (b) applying pressure to the heated meat patty (i) after a portion of the fat contained in the patty has been liquified during said heating step, (ii) only after the patty has been partially denatured on both sides, and (iii) while the fat portion remains liquified, the pressure being sufficient such that after processing, at least about 40% by weight of the fat contained in the patty is removed therefrom, but low enough such that a hamburger-like structure and texture is achieved;

(c) removing the liquified fat from the immediate vicinity of the patty by carrying out pressure step (b) while the patty is on a support surface constructed to promote the flow of liquified fat out of and away from the patty; and (d) introducing to the interior of the patty, after said steps of heating and pressing, a liquid for increasing the nonfat moisture content of the resulting patty.

13. The method according to claim 12 wherein the liquid is a flavoring solution which is injected into the patty along a central planar axis of the patty through said axis.

14. The method according to claim 12 wherein the liquid is a flavoring solution which is injected into the patty through the top of bottom surface of the patty.

15. A method as defined in claim 12 wherein said step of heating is carried out under temperature and time conditions such that at the completion of said step of heating the non-fat moisture content of the patty is at least 45% of the moisture content of the patty prior to initiating said step of heating.

16. A method as defined in claim 12 wherein said heating step is carried out to heat the patty to an average center temperature between about 45° C. and 75° C.

17. A method as defined in claim 12 wherein the average pressure applied during said step of applying pressure is between about 2.5 and 14 pounds per square inch.

18. A method as defined in claim 12 wherein said step of applying pressure is carried out by applying rolling pressure to the heated meat patty.

* * * * *